US005744204A

United States Patent [19]

Jester

[11] Patent Number: 5,744,204
[45] Date of Patent: Apr. 28, 1998

[54] LAMINATES COMPRISING COEXTRUDED LIQUID CRYSTAL POLYMER FILMS AND DISCARDABLE THERMOPLASTIC OUTSIDE LAYERS

[75] Inventor: Randy Douglas Jester, Greer, S.C.

[73] Assignee: Hoechst Celanese Corp., Somerville, N.J.

[21] Appl. No.: 761,042

[22] Filed: Dec. 5, 1996

[51] Int. Cl.⁶ .............................. B32B 27/32; G02F 1/1335
[52] U.S. Cl. ........................ 428/1; 428/474.4; 428/412; 428/480; 349/96
[58] Field of Search .................................. 428/480, 482, 428/483, 412, 1, 474.4; 349/96, 98, 97

*Primary Examiner*—Alexander Thomas
*Attorney, Agent, or Firm*—P. S. Kalyanaraman

[57] ABSTRACT

This invention discloses laminates comprising a liquid crystal polymer film inside and non-adherent, non-liquid crystalline polymer film on the outside, prepared by a process of coextrusion. Delamination of the outside layers yields a liquid crystal polymer film of superior surface quality. The invention is particularly suitable for preparing liquid crystal polymer-based polarizers with improved surface quality.

13 Claims, No Drawings

LAMINATES COMPRISING COEXTRUDED LIQUID CRYSTAL POLYMER FILMS AND DISCARDABLE THERMOPLASTIC OUTSIDE LAYERS

RELATED APPLICATIONS

The invention disclosed in this application is related to that disclosed in copending U.S. patent application Ser. No. 08/761,109, filed of even date herewith.

FIELD OF THE INVENTION

This invention relates generally to the field of liquid crystal polymers ("LCPs"). It is also related to polarizers for liquid crystal display applications, and specifically to liquid crystal polymer-based polarizers.

BACKGROUND OF THE INVENTION

Liquid crystal polymers are well known. Several applications are known for LCPs, more recently as components for polarizers in liquid crystal displays (LCDs). LCDs are widely used components in applications such as, for example, Notebook Personal Computers (PCs), calculators, watches, liquid crystal color TVs, word processors, automotive instrument panels, anti-glare glasses and the like. A useful review article, for example, is "Digital Displays" by in *Kirk-Othmer Encyclopedia of Chemical Technology*, Third edition, Volume 7, page 726 (1979), Wiley-Interscience Publication, John Wiley & Sons, New York. Polarizers are important components of liquid crystal displays. Typically, Polarizers are used in the form of film, the polarizer film (also called polarizing film). In an LCD, the liquid crystal elements are generally sandwiched between two layers of polarizing films.

Traditional polarizing films comprise a stretched polymer film such as, for example, polyvinyl alcohol (PVA), a dichroic absorber and other optional layers. The dichroic absorber is usually iodine or a dichroic dye that is absorbed in the polymer film. However, there are several disadvantages with such films that make them unsuitable for advanced and sophisticated applications. Some such disadvantages include, for example, non-uniformity, separation of the absorber over time, susceptibility to moisture and the like. For this reason, liquid crystalline polymer-based polarizers are being developed for polarizers. The process of molding or extrusion generally achieves a high degree of stable orientation in such polymers.

U.S. patent application Ser. No. 08/460,288, filed Jun. 2, 1995, now U.S. Pat. No. 5,672,296 discloses novel liquid crystalline polymer compositions useful in polarizer applications. Illustrative compositions disclosed therein are liquid crystalline polyesters which comprise repeat units corresponding to the formula:

$$-[P^1]_m-[P^2]_n-[P^3]_q-$$

wherein $P^1$, $P^2$ and $P^3$ represent monomeric moieties with $P^1$ being an aromatic hydroxy carboxylic acid, $P^2$ being an aromatic dicarboxylic acid and $P^3$ being a phenol; and m, n and q represent mole percent of the respective monomers ranging from 5–70 mole percent individually. Additional monomers may also be present. A preferred composition in the same patent is a film-forming wholly aromatic thermotropic liquid crystal polyester which comprises five monomeric moieties derived from 4-hydroxybenzoic acid, terephthalic acid, 4,4'-dihydroxybiphenyl, 6-hydroxy-2-naphthoic acid, and resorcinol in a molar ratio 30:20:10:30:10 respectively. Such LCPs are converted to polarizing films by combining them with suitable dichroic absorbers and then melt extrusion to yield the films.

There are also LCPs which contain dichroic dyes as covalently linked part of the LCP repeat unit. U.S. patent application Ser. No. 08/561,607, filed Nov. 21, 1995, discloses some such polymers. These LCPs, which need not be combined with dichroic dyes, are also processed by a similar melt extrusion to form polarizing films.

Melt extruded LCP films, however, typically exhibit a degree of machine direction-oriented surface texture and therefore need polishing prior to further use. In the case of LCPs for polarizers, the films, especially in the required thickness of 1 mil (25 µm) or less, easily fibrillate and are also damaged easily during slitting and winding operation. It will be preferable to have some sheathing layers on the LCP (as a laminate, for example) during such operations. The sheaths, however, should be easily removable for subsequent steps.

Laminates of LCPs containing other LCPs as surface layers on both sides are known. For example, U.S. Pat. No. 5,248,530 discloses such laminates prepared by coextrusion. However, the outside LCPs in such laminates cannot be delaminated. Therefore, any further processing of such laminate has to include the entire laminate and not just the center LCP alone.

There is a need in the industry for laminates from LCPs and non-liquid crystalline polymers, where the non-liquid crystalline polymer can be delaminated later for further processing of the LCP for any intended application.

There is also a need in the LCD industry for an improved polarizer film with improved surface characteristics. It will be ideal if the polarizer comprises LCP moieties.

It is, therefore, an object of this invention to provide improved quality LCP laminates prepared from LCPs and non-liquid crystalline polymers wherein the non-liquid crystalline polymer can be delaminated later if so desired.

It is a further object of this invention to provide LCP-based polarizer films which contain surface protecting films thereon that may be delaminated to provide polarizers with improved surface quality which polarizers may be processed further by conventional methods to yield an improved device.

It is a still further objective of this invention to provide polarizers containing fewer defects.

Other objects and advantages of the present invention will be apparent to those skilled in the art as well as from the following description and Examples.

SUMMARY OF THE INVENTION

One or more of the foregoing objectives are achieved by the provision in the present invention of improved LCP-containing laminates. The laminates comprise an LCP-film in contact with surface layers of a suitable non-adherent, non-liquid crystalline polymer sheath on both sides of the LCP film. In another embodiment, the present invention also provides laminates wherein an LCP-based polarizing film is in contact with surface layers of a non-adherent, non-liquid crystalline polymer sheath on both sides of the LCP polarizing film.

The inventive improved laminates are prepared by a process comprising lining an LCP on both sides with the non-liquid crystalline polymer by a process of coextrusion. In one illustration, a suitable LCP material is melted in a suitable extruder. The non-LCP polymer is also converted into a melt stream and extrusion is performed such that both the LCP and the non-LCP materials form films and that the LCP film is lined on both sides by the non-LCP film. In cases, where the LCP material has the dichroic absorber already dissolved in it (to make it suitable and processable directly to a polarizer film), the same kind of extrusion is performed. In this case, the LCP-based polarizer film is directly formed in the middle flanked on either side by the sheath polymer film.

The external layers provide sufficient strength to the LCP film in the subsequent steps such as, for example, winding, slitting and transport. When needed, the non-liquid crystalline polymer layers are easily delaminated to provide LCP films with improved surface quality. If the LCP film is suitable to be used for polarizer application, after such delamination it may be suitably dyed with a dichroic absorber to form the polarizing film. Of course, when the LCP material already had the dye dissolved in it, delamination would directly yield a polarizer film. In either case, the polarizer film has fewer surface defects than previously known, non-coextruded LCP-polarizers and thus yield better devices.

Preferred non-liquid crystalline polymers for the surface layers are thermoplastics.

DESCRIPTION OF THE INVENTION

In one embodiment, the present invention discloses improved LCP-containing laminates. The laminates comprise an LCP film located between two layers of a non-adherent, non-liquid crystalline polymer. The non-liquid crystalline polymer (which acts as the cover layer, alternately referred to as the glazing layer, sheathing layer or surface layer herein) is preferably a thermoplastic polymer. The laminate is prepared by coextruding the LCP film with the non-liquid crystalline polymer film. The coextrusion process insulates the LCP film from contact with the die surface during extrusion and thus leads to a substantially smooth surface. Since the outside layers are from a non-adherent film, they are easily peeled off prior to any subsequent processing steps. Peeling off the surface layer then yields LCP films with significantly improved surface quality.

In another embodiment, the invention provides improved LCP-based polarizer films with improved surface quality. An LCP material suitable for polarizer use is laminated on both sides with a non-adherent, non-liquid crystalline polymer similar to the above. Delaminating the surface films then yields an improved LCP film which may be then converted into a polarizing film by dyeing it suitably. If the LCP material already has the dye dissolved in it, then the inventive coextrusion followed by delamination yields the improved quality polarizing film. If the LCP has the dye moieties as covalently linked part of the LCP, then also the present invention directly yields polarizing LCP films with significantly improved surface properties.

In an illustrative case, laminates were prepared with an LCP film in the middle and a non-adherent polyethylene terephthalate ("PET") film layer on both surfaces of the LCP by coextrusion. The laminates had an ABA arrangement, where A refers to the PET layers and B refers to the middle LCP layer. Afterwards, the PET layers were peeled off, and the resulting LCP film was optically examined. For comparison, the same LCP was extruded as a monolayer by conventional melt extrusion method (without the PET surface layers). Both the inventive and the comparative LCP film were checked for surface quality. Surface roughness was measured by a Feinpruf Perthometer (Model 55P from Mahr Corporation, Cincinnati, Ohio) as well as high magnification micrographs. Significantly improved and smoother surface was noticed in the inventive LCP as compared to the monolayer extruded LCP. Since, as skilled practioners know, surface roughness has deleterious effects in a film which is to be used in optical applications, the coextruded laminates of the present invention offer substantial benefit in the preparation of improved LCP films generally and LCP-based polarizer films particularly.

The invention is particularly suitable for LCP-based polarizers. Many such polarizers are generally prepared from suitable LCP materials which are then combined suitably with a suitable dichroic absorber and melt extruded suitably to prepare the dye-containing LCP-based polarizer film. Alternately, the LCP material may already contain the dye dissolved in it. The dichroic absorber may be organic or inorganic. Examples of LCP materials suitable for polarizing film as well as process of dyeing them with a suitable dichroic absorber are disclosed in the above-mentioned pending patent application Ser. No. 08/460,288. The liquid crystal polymers therein may be liquid crystalline polyester, polyamide, polyesteramide, polyketone, polyether and the like. Liquid crystalline polyesters are generally preferred. A suitable LCP disclosed in the '288 application comprises repeat units corresponding to the formula:

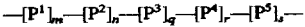

wherein $P^1$, $P^2$, $P^3$, $P^4$ and $P^5$ represent monomeric moieties with $P^1$ being an aromatic hydroxy carboxylic acid, $P^2$ being an aromatic dicarboxylic acid, $P^3$ being a phenol, $P^4$ being a second aromatic hydroxy carboxylic acid and $P^5$ being a second phenol; and m, n, q, r and s represent mole percent of the respective monomers with m, n and q ranging from 5–70 mole percent individually, while r and s range from 5–20 mole percent individually. Alternately, the dye may be a covalently linked part of the liquid crystal polymeric chain. Examples of the latter are disclosed in pending patent application Ser. No. 08/561,607 noted earlier. Whether covalently dyed, dye-dissolved-in, or dyed later, the LCP film has preferred thickness in the range 4–25 μm for polarizer applications.

Suitable non-liquid crystalline polymers which form the cover layers for the inventive laminates are non-adherent, non-liquid crystalline polymers, preferably thermoplastics. Suitable thermoplastics include, for example, polyesters, polycarbonates, polyolefins, polyacrylates, polyestercarbonates, polyamides, polyketones, polyethers, cyclic olefin polymers and copolymers ("COC") and the like. Important criteria for their selection include their optical clarity as well as their thermal and mechanical properties. Preferred are the polyesters, many of which are well-known thermoplastics. Examples are polyethylene terephthalate ("PET") and polybutylene terephthalate ("PBT"). The cover layer is in the 0.5 mil to 2 mil (2.5–50 μm) thickness range in the practice of the present invention. The cover layer polymer on either side of the LCP may be the same or different polymer provided they have suitable optical, thermal and the like properties as noted above.

It is important that the surface polymer is non-adherent to the liquid crystal polymer film in the laminate. In such a case, after coextrusion, the cover layers may be easily delaminated. Delamination may be done by any suitable means, including, for example, manual peeling off.

The process of preparing an inventive laminate is illustrated in the Examples section below. The invention is illustrated with PET as the surface layers (same on both sides) and an LCP material disclosed in the '288 application and referred to as COTBPR therein as the middle layer. COTBPR comprises repeat units from 4-hydroxybenzoic acid, terephthalic acid, resorcinol, 4,4'-biphenol and 6-hydroxy-2-naphthoic acid. As stated above, after preparation of the PET/LCP/PET coextruded laminate, the cover layers may be peeled off to expose the improved LCP film which may be then dyed suitably. Alternately, if the LCP material already had the dye dissolved in it, the film need not be dyed again. The polarizer film may then be further processed suitably by conventional methods to make devices such as, for example, liquid crystal display devices.

The present invention has several key advantages over prior known laminates and processes for preparing them. The advantages include ease of operation, cost advantages as well as improved surface quality in the resulting delaminated film. For polarizer films, they are particularly attractive since the coextrusion process yields better surface quality in the film and hence better optical suitability.

The following Examples are provided to further illustrate the present invention, but the invention is not to be construed as being limited thereto.

EXAMPLES

Example 1

Preparation of COTBPR: This example illustrates the preparation of COTBPR polyester from a 1 mole reaction mixture of 4-hydroxybenzoic acid ("HBA"), 6-hydroxy-2-naphthoic acid ("HNA"), terephthalic acid ("TA"), 4,4'-biphenol ("BP"), and resorcinol ("R") in the ratio 30:30:20:10:10.

To a 500 ml 3-neck flask equipped with a half-moon shaped TEFLON® stirrer blade, gas inlet tube, thermocouple, a Vigreux column attached to a condenser and receiver were added the following:

a) 41.440 grams of 4-hydroxybenzoic acid (0.3 moles);

b) 56.456 grams of 6-hydroxy-2-naphthoic acid (0.3 moles);

c) 33.226 grams of terephthalic acid (0.2 moles);

d) 18.600 grams of 4,4-biphenol (0.1 moles);

e) 11.012 grams of resorcinol (0.1 moles);

the flask was immersed in an oil bath and provided with means to accurately control the temperature. The flask was thoroughly purged of oxygen by evacuation and then flushed with nitrogen three times, and slowly heated in the oil bath; and f) 0.02 grams of potassium acetate was added as a catalyst along with 105.48 grams of acetic anhydride (2.5% excess). Acetic acid began to distill over and was collected in a graduated cylinder.

The contents of the flask were heated while stirring at a rate of 2000 rpm to 200° C. over a period of 60 minutes at which time 10 ml of acetic acid had been collected. The reaction temperature was then gradually raised at a rate of about 1° C./min to 320° C. at which time 96 ml of acetic acid had been collected. The flask was heated at 320° C. for another 60 min. A total of 110.5 ml of acetic acid had been collected. The flask was then evacuated to a pressure of 1.0 mbar at 320° C. while stirring. During this period the polymer melt continued to increase in viscosity while the remaining acetic acid was removed from the flask. The flask and its contents were removed from the oil bath and were allowed to cool to the ambient temperature. Polymer was then removed from the flask and a total of 120 grams of polymer was obtained.

The resulting polyester had an inherent viscosity (IV) of 2.0–2.4 dl/g as determined in a pentafluorophenol solution of 0.1 percent by weight concentration at 60° C. and a melt viscosity (MV) of 550 poise at a shear rate of $10^3$ sec$^{-1}$ measured at 230° C. in a capillary rheometer using an orifice of 1 mm diameter and 30 mm length.

When the polymer was subjected to differential scanning calorimetry (10° C./min heating rate), it exhibited a glass transition temperature (Tg) of 106° C. When the polymer was examined by hot-stage cross-polarized optical microscopy, it has a transition temperature from solid to liquid crystalline ($T_{s \to lc}$) at 170° C. The polymer melt was optically anisotropic.

Example 2

Coextrusion Experiments: COTBPR (melt stream B) was extruded from a 2" single screw extruder at the conditions shown in Table 1. Bottle resin grade PET from Hoechst Celanese Corporation (melt stream A) was extruded from a 3½ inch Egan single screw extruder (from Egan Davis Standard, Somerville, N.J.) at the conditions shown in Table 1. The two melt streams were combined in a commercial "ABA" structure combining block (from Cloeren, Inc., Orange, Tex.) and the combined melt streams were extruded from a commercial 24 inch wide coat hanger style film die (from Extrusion Dies, Inc., Chippewa Falls, Wis.) into the nip between a rubber roll and a steel roll where the melt was cooled and solidified. The film laminate produced had the structure of 2 mil PET/1 mil COTBPR/2 mil PET. After production the PET layers were delaminated manually from the COTBPR layer to produce free-standing COTBPR film. A 2 mil PET/0.6 mil COTBPR/2 mil PET structure was similarly produced and separated to produce a 0.6 mil COTBPR film.

TABLE 1

|  | Extrusion Melt Temp. (°C.) | Feedblock Temp. (°C.) | Die Temp. (°C.) | Extrusion Rate (pph) | Take up Speed fpm |
| --- | --- | --- | --- | --- | --- |
| PET | 285 | 280 | 260 | 34 | 12 |
| COTBPR | 250 | 280 | 260 | 9.8 | 12 |

The COTBPR films were analyzed for machine direction surface texture by a "Perthometer" contact stylus type surface analyzer and optical DIC (differential interference contrast microscopy). The analysis for the COTBPR layer is shown in Table 3. The average roughness (Ra) is around 0.1 microns with a maximum peak to valley (Rt Maximum) distance in the range of 2 micron. The DIC photographs (obtained using a Nikon Microphot FX with Epi Nomarski, from Nikon, Inc., Melville, N.Y.) show only a very low level of the machine direction surface striations.

Example 3

Comparative Example: A monolayer COTBPR extruded film was produced using the same COTBPR polymer and similar extrusion conditions described in the preceding example (see Table 2). The surface analysis of this 1 mil COTBPR film shows a Ra of over 0.3 microns and a Rt Maximum of about 3 microns.

TABLE 2

| | Extrusion Melt Temp. (°C.) | Adaptor Temp. (°C.) | Die Temp. (°C.) | Extrusion Rate (pph) | Take up Speed fpm |
|---|---|---|---|---|---|
| COTBPR | 250 | 250 | 245 | 10 | 11 |

The Rt Maximum shows that in areas where valleys and peaks on opposite side of the film reinforce each other the 25 micron thick films thickness on a small scale in the range of (0.5 mm) could range from 22μ to 28μ. This ±12% small scale thickness nonuniformity is unacceptable for a dyed polarizer film. The DIC photographs also show a very pronounced level of machine direction striation in the film surface.

Example 4

Coextrusion of dyed LCP with a non-LCP plus an LCP: This Example illustrates that a dyed LCP may be coextruded with two layers on either side: an undyed LCP layer in contact with the dyed LCP, and a non-LCP layer in contact with the undyed LCP. In other words, the dyed LCP layer is in the middle, while the non-LCP layers are on the outside, with the undyed LCP layer in between them. Thus, COTBPR material is dyed with a suitable dichroic absorber and this dyed COTBPR is used for melt stream C. Melt stream B is undyed COTBPR, while melt stream A is a non-adherent, non-liquid crystalline polymer. A coextruded film of the type ABCBA is formed using a suitable extruder, as described before. If any dye happens to migrate or diffuse from the dyed COTBPR during the coextrusion process, it will still be in the oriented LCP layer it is in contact with. Thereby orientation stays preserved.

What is claimed is:

1. A laminate comprising a liquid crystal polymer film in the middle and a non-adherent, non-liquid crystalline polymer film on both sides of said liquid crystal polymer film, wherein said non-adherent, non-liquid crystalline polymer film is suitable to be subsequently delaminated from said laminate.

2. The laminate of claim 1, wherein said non-adherent, non-liquid crystalline polymer is a thermoplastic.

3. The laminate of claim 2, wherein said thermoplastic is selected from the group consisting of polyester, polycarbonate, polyolefin, polyacrylate, polyestercarbonate, polyamide, polyketone, polyether cyclic olefin homopolymer and cyclic olefin copolymer.

4. The laminate of claim 3, wherein said thermoplastic is polyester.

5. The laminate of claim 4, wherein said polyester is selected from the group consisting of polyethylene terephthalate and polybutylene terephthalate.

6. The laminate of claim 5, wherein said polyester is polyethylene terephthalate.

7. The laminate of claim 1, wherein said non-adherent, non-liquid crystalline polymer is the same polymer material on both sides of said liquid crystal polymer film.

8. The laminate of claim 1, wherein said non-adherent, non-liquid crystalline polymer is a different polymer material on both sides of said liquid crystal polymer film.

9. The laminate of claim 1, wherein said liquid crystal polymer is selected from the group consisting of polyester, polyamide, polyesteramide, polyketone, and polyether.

10. The laminate of claim 9, wherein said liquid crystal polymer is a polyester.

11. The laminate of claim 10, wherein said polyester comprises repeat units corresponding to the formula:

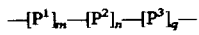

TABLE 3

SURFACE CHARACTERIZATION

| FILM TYPE* | THICKNESS (mils) | Ra Average (microns) TD | Rs Average (microns) TD | Rz Average (microns) TD | Rt Maximum (microns) TD |
|---|---|---|---|---|---|
| Comparative Example | | | | | |
| COTBPR Monolayer | 1 | | | | |
| Side A | | 0.381 | 0.474 | 2.063 | 3.337 |
| Side B | | 0.338 | 0.423 | 1.895 | 2.561 |
| Example 1 | | | | | |
| COTBPR Coextruded | 1 | | | | |
| Side A | | 0.1 | 0.124 | 0.513 | 0.849 |
| Side B | | 0.074 | 0.093 | 0.525 | 1.107 |
| COTBPR Coextruded | 0.6 | | | | |
| Side A | | 0.111 | 0.146 | 0.617 | 1.189 |
| Side B | | 0.141 | 0.182 | 0.756 | 1.246 |

*Same polymer used for all films
Trace Length = 4.8 mm
Cutoff Wave = 0.25 mm
Stylus = 5 micron radius
Ra—Arithmetic average roughness value.
Rs—Geometric average roughness value.
Rz—Average roughness depth of the 5 individual Z values.
Rt—Maximum vertical difference for highest and lowest point wherein $P^1$, $P^2$ and $P^3$ represent monomeric moieties with $P^1$ being an aromatic hydroxy carboxylic acid, $P^2$ being an aromatic dicarboxylic acid and $P^3$ being a phenol; and m, n and q represent mole percent of the respective monomers ranging from 5–70 mole percent individually.

12. The laminate of claim 11, wherein said polyester comprises moieties from 4-hydroxybenzoic acid, terephthalic acid, 6-hydroxy-2-naphthoic acid, 4,4'-biphenol and resorcinol with the respective monomer ratio 30:20:10:30:10.

13. The laminate of claim 1, which is subsequently delaminated to remove said non-adherent, non-liquid crystalline polymer film.

* * * * *